United States Patent [19]
Casey et al.

[11] Patent Number: 5,888,446
[45] Date of Patent: Mar. 30, 1999

[54] METHOD OF FORMING AN ALUMINUM NITRIDE ARTICLE UTILIZING A PLATINUM CATALYST

[75] Inventors: Jon A. Casey, Poughkeepsie, N.Y.; Jonathan H. Harris, Scottsdale, Ariz.; Lester Wynn Herron, Hopewell Junction, N.Y.; Irvin Huseby, Scottsdale, Ariz.; Richard A. Shelleman, Poughkeepsie; Subhash L. Shinde, Corlandt Manor, both of N.Y.; Robert A. Youngman, Paradise Valley, Ariz.

[73] Assignees: International Business Machines Corporation, Armonk, N.Y.; Crystalline Materials Corporation, Phoenix, Ariz.

[21] Appl. No.: 7,625

[22] Filed: Jan. 15, 1998

[51] Int. Cl.$^6$ ............ C04B 35/581; C04B 35/64
[52] U.S. Cl. ............ 264/669; 264/614; 264/670
[58] Field of Search ............ 264/669, 670, 264/614

[56] References Cited

U.S. PATENT DOCUMENTS

| | | | |
|---|---|---|---|
| 4,474,731 | 10/1984 | Brownlow et al. | 419/5 |
| 4,778,549 | 10/1988 | Cowan, Jr. et al. | 156/89 |
| 4,810,463 | 3/1989 | Schwarz et al. | 419/10 |
| 4,883,780 | 11/1989 | Kasori et al. | 501/96 |
| 5,147,484 | 9/1992 | Chance et al. | 156/89 |
| 5,256,609 | 10/1993 | Dolhert | 501/96 |
| 5,424,261 | 6/1995 | Harris et al. | 501/96 |
| 5,482,903 | 1/1996 | Duncombe | 501/32 |

*Primary Examiner*—James Derrington
*Attorney, Agent, or Firm*—Ira D. Blecker

[57] ABSTRACT

Disclosed is a method of forming an aluminum nitride article. The method includes the steps of adding platinum to a composition including a binder, aluminum nitride particles and a sintering aid; forming the composition into an article; placing the article in a substantially non-carbonaceous container; and sintering the article in a reducing atmosphere to cause removal of the binder and densification of the aluminum nitride article, wherein the platinum catalyzes the removal of the binder.

11 Claims, No Drawings

METHOD OF FORMING AN ALUMINUM NITRIDE ARTICLE UTILIZING A PLATINUM CATALYST

BACKGROUND OF THE INVENTION

This invention relates to the method of producing an aluminum nitride article and, more particularly, relates to a method of producing an aluminum nitride article utilizing a platinum catalyst to enhance the removal of carbon.

Aluminum nitride has been of interest recently for electronic packaging applications because of its high thermal conductivity, thermal expansion matching with silicon, low dielectric constant (8.5) and high electrical resistivity.

The present invention is particularly suitable for co-fired electronic packages, also known as substrates, but has applicability to aluminum nitride articles in general. The remaining discussion will focus on co-fired aluminum nitride electronic packagages but it should be understood that the present invention has applicability to other aluminum nitride articles.

In one co-firing process, the aluminum nitride is formed into greensheets (comprised of aluminum nitride particles in an organic binder), vias are punched, metallization paste (comprised of metallic particles in an organic binder ) is screened or extruded onto the greensheets and into the vias, the greensheets are stacked and laminated to form a substrate in the green state, and then the green substrate is sintered to densify the aluminum nitride layers and the metallization. "Co-fired" means that the metallic paste is sintered during the same sintering schedule as the aluminum nitride body. The metallization for aluminum nitride substrates is typically tungsten but may also be molybdenum or a mixture of tungsten and molybdenum. In addition, instead of forming the aluminum nitride body by using greensheets, dry pressing may be used to form the aluminum nitride body.

Binder removal from aluminum nitride laminates during sintering is difficult due to the required use of highly reducing (e.g., forming gas) ambients. When retained carbon levels are high at elevated temperatures (e.g., greater than 1200 degrees C.), the refractory metallurgy will carburize to form a carbide. For example, if tungsten metallurgy is used, the tungsten forms tungsten carbide (WC). The carbide, WC in this case, can have a severe impact on electrical performance of the metallurgy.

The carbon removal process is further complicated in the aluminum nitride system in that both aluminum nitride and sintering additives used can have substantial equilibrium vapor pressure at the sintering temperature. To attain close to 100% densification, the aluminum nitride laminates are enclosed in either a refractory metal box or a box made from unsintered aluminum nitride laminates which, for convenience, could be aluminum nitride kerf. The enclosed configuration creates additional problems in binder removal since the exchange of both reactants and by-product of binder removal are greatly reduced, thereby resulting in substantially higher retained carbon levels.

To accommodate the dual needs of binder removal and conservation of aluminum nitride and the sintering additives, a two-step firing cycle is utilized. First, the aluminum nitride laminates are subjected to binder burnoff by placing them in a furnace with a forming gas ambient at a temperature of about 900–1400 degrees C. After holding at this temperature for 2 to 6 hours, the aluminum nitride laminates are cooled to room temperature. The temperature for binder burnoff is insufficient to adversely affect densification during sintering. The second step is to sinter the aluminum nitride laminates by placing them in a box or container in a furnace with a forming gas ambient at a temperature of about 1550 to 1700 degrees C. After holding at this temperature for 5 to 8 hours, the aluminum nitride laminates are cooled to room temperature.

Such a two-step process is effective to remove carbonaceous residues while preventing the volatile components from evaporating. But, the two-step process also increases the cost of producing aluminum nitride products and reduces throughput.

Accordingly, it would be desirable to have a single-step process for producing aluminum nitride laminates.

Dolhert U.S. Pat. No. 5,256,609, the disclosure of which is incorporated by reference herein, discloses that for ceramics processed in reducing atmospheres, effective binder removal (and therefore also removal of residual carbon) can only be accomplished by use of a catalyst, a prolonged low temperature heating schedule, a wet gas atmosphere or a special binder. Dolhert does not disclose any particular catalyst to assist in effective binder removal. The prolonged low temperature heating schedule is not economically feasible while the wet gas atmosphere is not possible with the aluminum nitride materials contemplated by the present invention. Dolhert's invention relates to the provision of an atactic polypropylene-containing binder material.

Chance et al. U.S. Pat. No. 5,147,484, the disclosure of which is incorporated by reference herein, discloses the formation of mulitlayer ceramic substrates having copper metallurgy which are sintered in an air ambient. The ceramic material comprises a crystallizable glass. Zinc, platinum or chromium are added to the copper. The binder is decomposed and eliminated while the zinc, platinum or chromium combines or alloys with the copper. The platinum prevents oxidation of the copper-based conductor surface during binder burnout while the zinc or chromium forms a self-limiting surface oxide.

Kasori et al. U.S. Pat. No. 4,883,780, the disclosure of which is incorporated by reference herein, discloses an aluminum nitride body made from a composition comprising a binder, aluminum nitride powder, a sintering aid and at least one transition element (or a compound containing the transition element) from Groups IVa, Va, VIa, VIIa and VIIIa. Among the transition elements in these Groups are Fe, Co, Ni, Ru, Rh, Pd, Os, Ir and Pt. The composition, after being formed into an article, was placed in a carbon container and sintered in a nitrogen ambient. Kasori suggests the addition of the above transition elements to achieve improved densification and thermal performance and, additionally, for coloration of the sintered body.

Various solutions have been proposed for adding noble metals and other metals to enhance the removal of carbon from ceramic substrates.

Cowan, Jr. et al. U.S. Pat. No. 4,778,549, the disclosure of which is incorporated by reference herein, discloses the addition of a noble catalyst (Ru, Rh, Pd, Os, Ir, or Pt) to greensheets comprising a binder material and glass, glass-ceramic or ceramic particles. Binder burnout is accomplished in a wet nitrogen ambient. The noble catalyst catalyzes the removal of the binder resdiues.

Schwarz et al. U.S. Pat. No. 4,810,463, the disclosure of which is incorporated by reference herein, discloses the addition of nickel or tungsten, in the form of nickel salts and tungsten oxide, to impregnate a mass of alumina particles. The nickel or tungsten act to catalyze the removal of carbonaceous binder residues during binder burnoff in hydrogen or hydrogen/steam ambients.

Brownlow et al. U.S. Pat. No. 4,474,731, the disclosure of which is incorporated by reference herein, discloses the addition of nickel or palladium compounds to ceramic materials such as silica based materials. The nickel or palladium compound is mixed in with the polymeric binder before mixing with the ceramic materials. During the burn-off of the binder material, a wet hydrogen atmosphere is used. The nickel or palladium serves to catalyze the removal of carbonaceous binder residues during the binder burnoff.

Notwithstanding the above efforts, there still remains a need to improve the sintering of aluminum nitride bodies so that carbon residues remaining from binder removal during binder burnoff can be effectively removed.

Accordingly, it is a purpose of the present invention to have an improved method for the effective removal of carbonaceous residues remaining from binder removal.

It is a further purpose of the present invention to have a single-step method for the effective removal of carbonaceous residues and the effective sintering of aluminum nitride articles.

These and other purposes of the invention will become more apparent after referring to the following description of the invention.

BRIEF SUMMARY OF THE INVENTION

A method of forming an aluminum nitride article, the method comprising the steps of:
adding platinum to a composition comprising a binder, aluminum nitride particles and a sintering aid;
forming the composition into an article;
placing the article in a substantially non-carbonaceous container; and
sintering the article in a reducing atmosphere to cause removal of the binder and densification of the aluminum nitride article, wherein the platinum catalyzes the removal of the binder.

DETAILED DESCRIPTION OF THE INVENTION

According to the present invention, there is disclosed a method of forming an aluminum nitride article.

The present inventors have found that by adding platinum to an aluminum nitride composition and sintering the composition in a substantially non-carbonaceous container, carbon residues may be effectively removed while using a reducing ambient. It should be understood that a substantially non-carbonaceous container means a container that contains about 10 weight percent or less (based on the weight of the container) of carbon or carbon-containing material. Reducing ambient should be understood to mean an ambient containing hydrogen and may also include one or more carrier gases such as nitrogen or argon.

The aluminum nitride composition includes a binder material, aluminum nitride particles, a sintering aid and platinum. The binder material may be polyvinyl butyral (preferred), polymethyl methacrylate, polycarbonate or other thermally decomposable binders that are well known to those skilled in the art. As is conventional, solvents, plasticizers and Theological control agents may also be added to the composition.

The sintering aid is of significance in promoting the sintering of the aluminum nitride particles. Two conventional sintering aids that may be used with the present invention are a calcia-alumina-boria composition disclosed in Duncombe et al. U.S. Pat. No. 5,482,903, and a calcia-alumina-boria-yttria composition disclosed in Harris et al. U.S. Pat. No. 5,424,261, the disclosures of which are incorporated by reference herein.

Lastly, platinum is added to the composition in amounts of 10 to 1500 ppm, and more preferably 50 to 200 ppm, based on the weight of the solids. Platinum may be added as a powder. More preferably, platinum should be added as a solution to result in a finer particle size catalyst. By solution it is meant that the platinum metal is present as platinum ions or complex platinum ions. Solutions should be distinguished from suspensions or slurries wherein the elemental platinum powder is merely suspended in a liquid. A preferred platinum solution is chloroplatinic acid ($H_2PtCl_6 \cdot xH_2O$). Alternatively, the platinum could be precipitated onto the aluminum nitride particles in the following manner. To a suspension of aluminum nitride in a suitable solvent (e.g., isopropyl alcohol), a soluble platinum salt is added. The suspension is mixed and the solvents are then stripped off resulting in the precipitationof very fine platinum particles onto the surface of the aluminum nitride powder.

The present inventors have found that only platinum provides efficacious results. As will be demonstrated hereafter, platinum is compared to ruthenium, rhodium, iridium and nickel, and it was only platinum that demonstrated a significant drop in carbonaceous residues.

The composition as noted above is formed into an article, such as a substrate for electronic package applications. The step of forming may be by any conventional forming method, including but not limited to tape casting and spray drying followed by dry pressing or extrusion.

After forming, the article is placed into a suitable container. Since a purpose of the present invention is to limit the amount of carbon in the article, the article should be placed in a container that does not contain substantial amounts (i.e., 10 weight percent or less) of carbonaceous material. Some examples include refractory metal (e.g., tungsten, molybdenum, tantalum, titanium) containers and containers made from aluminum nitride kerf or aluminum nitride greensheets. Sintered aluminum nitride would also be acceptable.

It may appear to be inconsistent to sinter the article in a carbon-containing container, such as one made from aluminum nitride kerf, while also limiting the carbon present in the final article. However, this is not the case at all. During the early stages of sintering when pyrolysis and binder burnout are occurring, the kerf container is porous, thereby allowing carbon gases to escape from within the box. Later during the sintering cycle, the pores in the kerf box close when it is necessary to prevent the escape of the volatile components. Thus, any carbon present in the kerf container is fugitive. Again, it is necessary to limit the amount of carbon or carbon-containing material in the container to about 10 weight percent or less (based on the weight of the box) to achieve the efficacious results of the present invention.

Lastly, the article is sintered to pyrolyze and remove the binder and densify the aluminum nitride material. Sintering would take place between 1550 and 1700 degrees C. for about 10 hours in a forming gas ($H_2+N_2$) ambient followed by cooling to room temperature.

It has been found that articles produced according to the present invention had reduced concentrations of carbonaceous residue.

While not wishing to be held to any particular theory, it is believed that the platinum catalyzes the removal of carbonaceous residue. It is likely also that platinum would also catalyze a carbothermal reaction, which would also enhance the removal of carbonaceous residues. The carbothermal reaction can be stated as follows:

$$Al_2O_3 + N_2 + 3C > 2AlN + 3CO$$

Although the carbothermal reduction reaction of an oxide to form a nitride or carbide ceramic while consuming carbon is well known, the unexpected result suggested here is the significant effect that the presence of small amounts of platinum can have on the rate of this reaction and the temperature at which this reaction occurs.

Added alumina, or perhaps alumina impurities present in the aluminum nitride powder, promote the carbothermal reduction reaction. Thus, in order to promote the carbothermal reduction reaction as just described, it is advantageous to add additional $Al_2O_3$, such as about 1 weight percent or less, or an alumina precursor, such as a hydrate of alumina, which upon sintering results in $Al_2O_3$ of about 1 weight percent or less.

The advantages of the present invention will become more apparent after referring to the following examples.

EXAMPLES

Examples I

A number of samples were fabricated in the following manner. To a slurry composition consisting of aluminum nitride particles and polyvinyl butyral binder solution were added approximately 4 weight percent (based on the solids content of the slurry) of a sintering aid. The sintering aid consisted of calcia-alumina-boria glass plus yttria. To some of the samples, platinum was added in the form of chloroplatinic acid. Further, alumina was added to some of the samples. The slurry was cast into tape and then blanked, stacked and laminated. Some of the substrates were sintered in no box, a tungsten box or a kerf box made from aluminum nitride greensheet kerf (scrap leftover after blanking of the greensheet).

The resulting substrates were heated to either 1000 or 1200 degrees C. for 2–3 hours, just long enough to complete the pyrolysis and burnoff of the binder materials. The carbon remaining in the substrates was measured by a LECO carbon analyzer. The results are below in Table I.

TABLE I

| Pt level | Box | $Al_2O_3$ (w/o) | BBO & Temp, °C. | Carbon Level, PPM |
|---|---|---|---|---|
| 0 | None | 0 | 1000 | 5534 |
| 100 | None | 0 | 1000 | 4281 |
| 0 | None | 1 | 1200 | 2600 |
| 200 | None | 1 | 1200 | 770 |
| 0 | Metal | 1 | 1200 | 5350 |
| 200 | Metal | 1 | 1200 | 3300 |
| 0 | Kerf | 1 | 1200 | 5000 |
| 200 | Kerf | 1 | 1200 | 3000 |

As can be seen, platinum had a significant effect in reducing the residual carbon in the substrates sintered in the box. The results compare favorably to the substrates sintered without the box. It should be noted that the platinum was effective either alone or in combination with alumina additions. This supports the claims that the platinum is potentially catalyzing the carbon removal reaction and/or the carbothermal reaction with less carbon as a reactant. When used in combination ($Pt. + Al_2O_3$), the carbon removal is more effective within a box than even open (no box) uncatalyzed systems.

Examples II

A number of additional samples were fabricated in the following manner to test catalysts other than platinum. To a slurry composition consisting of aluminum nitride particles and polyvinyl butyral binder solution were added 4 weight percent (based on the solids content of the slurry) of a sintering aid. The sintering aid consisted of calcia-alumina-boria glass plus yttria. Ruthenium, rhodium, iridium or nickel were added to the slurry in the form of a soluble salt. One sample had no catalyst. The soluble salts used were ruthenium chloride, rhodium chloride, iridium chloride and nickel chloride. Other soluble ruthenium, rhodium, iridium and nickel salts would also work. After sintering, the amount of catalyst present was 100 ppm, except for the sample which had no catalyst. The slurry was cast into tape and then blanked, stacked and laminated. The substrates were sintered in the open ambient (i.e., no box was used). The resulting substrates were heated to 1000 degrees C. for 2–3 hours, just long enough to complete the pyrolysis and burnoff of the binder materials. The carbon remaining in the substrates was measured by a LECO carbon analyzer. The results are tabulated below in Table II. Also listed in Table II is the substrate produced using 100 ppm of platinum listed in Table I.

TABLE II

| Catalyst | None | Pt | Ru | Rh | Ir | Ni |
|---|---|---|---|---|---|---|
| Carbon level, ppm | 5534 | 4281 | 6949 | 5467 | 6233 | 5866 |

As can be seen, the only catalyst that had an effect on the carbon level was platinum.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A method of forming an aluminum nitride article, the method comprising the steps of:
    adding platinum to a composition comprising a binder, aluminum nitride particles and a sintering aid;
    forming the composition into an article;
    placing the article in a substantially non-carbonaceous container; and
    sintering the article in a reducing atmosphere to cause removal of the binder and densification of the aluminum nitride article, wherein the platinum catalyzes the removal of the binder.

2. The method of claim 1 wherein the composition further comprises alumina or a precursor of alumina.

3. The method of claim 1 wherein the platinum is added as a powder.

4. The method of claim 1 wherein the platinum is added as a solution.

5. The method of claim 1 wherein the substantially non-carbonaceous container is metal.

6. The method of claim 5 wherein the substantially non-carbonaceous container is made of a material selected from the group consisting of tungsten, molybdenum, tantalum and titanium.

7. The method of claim 1 wherein the substantially non-carbonaceous container comprises aluminum nitride.

8. The method of claim 1 wherein the platinum is added in the amount of 10 to 1500 ppm to the composition, based on the solids of the composition.

9. The method of claim 1 wherein the platinum is added in the amount of 50 to 200 ppm to the composition, based on the solids of the composition.

10. The method of claim 2 wherein the platinum is added in the amount of 10 to 1500 ppm to the composition, based on the solids of the composition.

11. The method of claim 2 wherein the platinum is added in the amount of 50 to 200 ppm to the composition, based on the solids of the composition.

* * * * *